Oct. 30, 1934.  F. D. JONES  1,978,582
BELT DRIVE
Filed Feb. 17, 1930
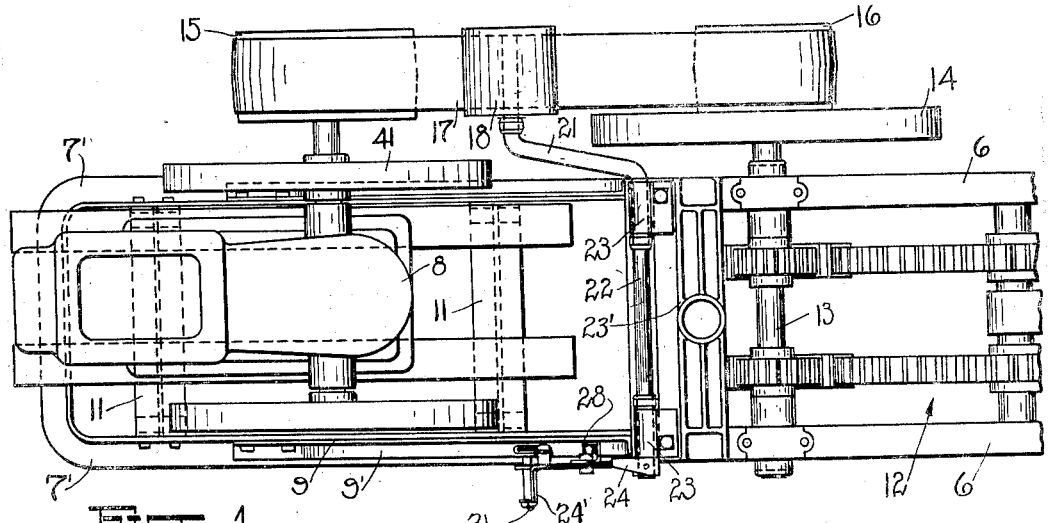
Fig. 1
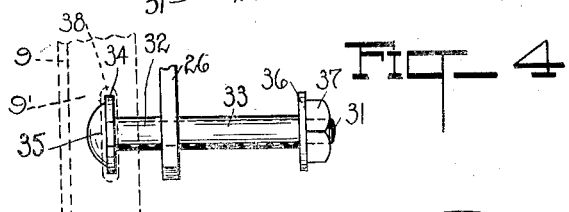
Fig. 4
Fig. 2
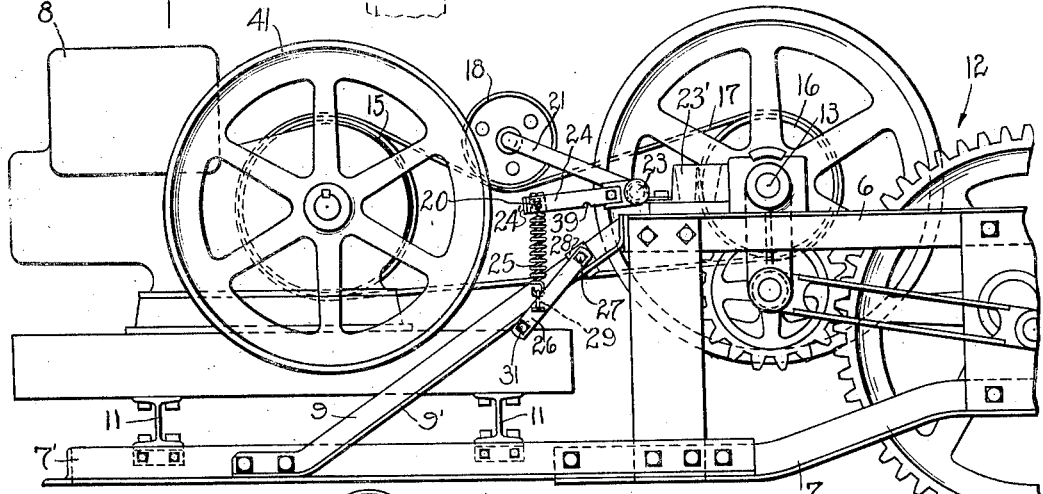
Fig. 3
INVENTOR
Frank D. Jones
BY Brown, Jackson, Boettcher & Dienner
ATTYS.

Patented Oct. 30, 1934

1,978,582

UNITED STATES PATENT OFFICE 1,978,582

BELT DRIVE

Frank D. Jones, Ottumwa, Iowa, assignor to Dain Manufacturing Company of Iowa, Ottumwa, Iowa, a corporation of Iowa Application February 17, 1930, Serial No. 428,922

14 Claims. (Cl. 64—5)

The present invention relates to a hay press of the type deriving its operating power from an engine mounted directly on the press, the invention having particular reference to the belt driving means through which power is transmitted from the engine to the main operating parts of the press. When the engine is to be cranked, or if it should be desired to stop the press temporarily with the engine operating, the power transmitting relation is interrupted by releasing a belt tightening pulley which coacts with the driving belt.

One of the objects of the invention is to provide an improved arrangement and mounting of this belt tightening pulley on the frame of the hay press.

Another object is to provide means which is operative to place tension on the spring of the belt tightening pulley when said pulley is in its operative position, and which is also operative to hold said pulley out of tightening engagement with the belt when the driving relation is to be interrupted.

Other objects of the invention will appear from the following description of a preferred embodiment thereof. In the accompanying drawing illustrating such embodiment:

Figure 1 is a plan view of the power end of a hay press embodying the invention;

Figure 2 is a fragmentary side elevational view of the same, showing the belt tightening pulley in its operative position;

Figure 3 is a fragmentary view similar to Figure 2, but showing the belt tightening pulley in its inoperative position, and Figure 4 is a fragmentary detail view of the end of the swinging arm which tensions the spring and also supports the pulley in its inoperative position.

Only the power end of the hay press has been shown, since the construction and arrangement of the baling chamber and the main baler parts co-acting therewith is well known. The frame of the machine is fragmentarily represented by the upper and lower angle bars 6 and 7, such frame being usually supported on transport wheels, not shown. The internal combustion engine 8 is supported on extensions 7' of the lower frame bars, such extensions being reenforced in their attachment to the main frame by the diagonal reenforcing bars 9. The bed of the engine 8 is shown as being mounted on transverse I-beams 11 which are bolted to the bed and to the frame bar 7'.

The baler operating mechanism is generally indicated at 12, such mechanism comprising parts for actuating the feeder head and the plunger, which operating connections need not be described, as they are well known. This baler operating mechanism comprises a transverse shaft 13 having mounted on one end thereof a fly wheel 14 and a belt pulley 16. Mounted on the crankshaft of the internal combustion engine 8 is a driving belt pulley 15, and traveling over these two pulleys 15, 16 is the driving belt 17.

The idler pulley which controls the tightening or loosening of the belt 17 is indicated at 18. This pulley is mounted on the crank portion 21 of a crankshaft 22 which is journaled in bearing brackets 23 secured to a casting 23' which in turn is secured to the upper frame bars 6.

Such mounting of the belt tightening pulley on the spindle end of the offset crank portion 21 provides for movement of the pulley between the two positions illustrated in Figures 2 and 3, representing driving and non-driving conditions of the belt. Secured to the shaft 22 is an arm 24 through which said shaft is rocked for swinging the pulley between its two positions, such arm being preferably mounted on the end portion of the shaft to dispose the spring and other parts co-acting with said arm at the side of the machine. The end of said arm is bent laterally to form an outwardly extending handle portion 24' to facilitate raising and lowering the idler pulley.

The spring which normally acts to maintain belt tightening pressure on the pulley 18 is indicated at 25, such spring being of the tension type and having its upper end connected to the arm 24. Such connection is preferably through an angle iron clip and cotter key, as indicated at 20, which permits the spring to swing back out of the way when the parts are in the position illustrated in Figure 3. The lower end of said spring is adapted to be connected to a power-transmitting control member 26. Such member is in the form of a lever pivotally connected by a bolt or rivet 27 to an angle bracket 28 which is rigidly secured to the vertically extending flange of the adjacent diagonal brace bar 9. The connection of this lower end of the spring with said control member 26 is through a chain link and cotter key, as indicated at 29, which also permits the lower end of the spring to swing back out of the way when the control member is swung up to the position illustrated in Figure 3. Extending through the swinging end of said lever 29 is a bolt 31, which is adapted to serve as a handle for said lever, and also as a detent means which I shall presently describe.

When said lever is swung down to the position illustrated in Figure 2, it places the desired tension on the spring 25 for holding the idler pulley 18 down against the upper run of the belt under a predetermined pressure. By virtue of this lever arrangement, with the link connection 29 disposed intermediate the ends of the lever 26, a mechanical advantage is afforded through the lever for exerting the desired tension on the spring with relatively small effort applied to the end of the lever.

Referring to Figure 4, it will be seen that the bolt 31 projects from opposite sides of the lever and has sleeves 32 and 33 mounted on such projecting portions. The inner sleeve 32 is confined between the lever and a washer 34 which bears against the head 35 of the bolt. The outer sleeve 33 is confined between the lever and a washer 36 which bears against a nut 37 screwing over the end of the bolt, such nut serving to rigidly clamp the spacing sleeves, washers and bolt to the end of the lever 26. When the lever has been swung down to the driving or power-transmitting position illustrated in Figure 2 it is retained in such position by swinging the end thereof laterally to enable the inner end of the handle portion to be engaged under the laterally projecting flange 9' of the diagonal brace bar 9, such flange serving as a stop for holding the lever in this position.

As illustrated in Figure 4, a slot 38 may be provided in such flange for receiving the upper portion of the washer 34, the edge of this slot and the side surface of the washer forming co-operating shoulders for normally preventing sidewise movement of the lever which might otherwise permit accidental release of the lever. Such shoulders are separated from each other, for permitting disengagement of the lever from the stop flange 9', by forcing the lever downwardly and then swinging it outwardly.

When the engine is to be cranked it is preferable to lift the idler pulley 18 entirely out of engagement with the belt 17 so as completely to disconnect the engine from the baler operating mechanism 12. The transmission control lever 26 also performs the additional function of supporting the idler pulley in this raised position out of engagement with the driving belt. This is effected by releasing the swinging end of the lever from the stop flange 9', swinging it upwardly and bringing this swinging end of the lever into supporting engagement with the underside of the arm 24. Formed in the lower edge of said arm 24 is a notch 39 affording a shoulder for engaging over the spacing sleeve 33 or 32 on the swinging end of the lever.

Thus, as shown in Figure 3, the lever is releasably held in its approximately upright position, serving as a strut for holding the pulley mounting member 21, 22 in inoperative position with the idler pulley out of contact with the belt.

It will be seen from the foregoing that the offset diagonal bend of the crank portion 21 enables this crank portion to extend between and clear the driving fly-wheel 41 on the engine and the driven fly-wheel 14 on the operating mechanism, as best shown in Figure 1; that the extension of the rock-shaft or mounting member 22 across the entire width of the baler frame enables widely spaced points of bearing support to be obtained and also disposes the idler pulley at one side of the machine and its control mechanism at the other side thereof in convenient position for operation; and, that the single control member 26 serves in one position to place spring pressure on the idler pulley for holding it against the belt, and in another position to hold such idler pulley entirely removed from the belt.

I claim:

1. In a hay press comprising a frame, an engine mounted thereon having a driving pulley, baler operating mechanism on said frame including a driven pulley, and a belt trained over said pulleys; the combination of an idler pulley for tightening said belt, a crankshaft mounted for rocking movement on said frame, said idler pulley being rotatably mounted on the crank portion of said shaft, an arm extending from said shaft, a tension spring connected with said arm, a control lever pivotally mounted on said frame and adapted to have connection with said spring, movement of said lever to one position serving to place tension on said spring for holding said idler pulley resiliently against said belt, stop means on said frame engageable by said lever for holding the same in the latter position, said lever being movable to another position in engagement with said arm for holding said idler pulley out of engagement with said belt, and means for retaining said lever in the latter position.

2. In a hay press comprising a frame, an engine mounted thereon having a driving pulley, baler operating mechanism on said frame including a driven pulley, and a belt trained over said pulleys; the combination of a rock shaft extending transversely of said frame and pivotally mounted thereon, a crank portion extending from one end of said rock shaft, an idler pulley mounted on said crank portion and adapted to engage said belt for tightening the same, an arm extending from the other end of said rock shaft at the other side of the frame, a tension spring connected with said arm, a lever pivotally mounted on said frame at the latter side thereof, said lever being adapted to have connection with said spring and movable to one position to place tension on said spring for holding said idler pulley resiliently against said belt, said frame comprising a bar having a portion thereof serving as a stop engageable by said lever for holding said lever in the latter position, said lever being movable to another position in engagement with said arm for holding said idler pulley out of contact with said belt, and cooperating means on said arm and said lever for holding said lever in the latter position.

3. In a hay press comprising a frame, an engine mounted thereon having a driving pulley, baler operating mechanism on said frame including a driven pulley, and a belt trained over said pulleys; the combination of an idler pulley for tightening said belt, a movable mounting member for said idler pulley comprising a rock shaft mounted on said frame, spring means for cooperating with said idler pulley, and a power control member connected with said rock shaft through said spring means and operable in one position to render said spring means effective and in another position to interlock with said mounting member to hold said idler pulley out of engagement with said belt.

4. In a hay press comprising a frame, an engine mounted thereon having a driving pulley, baler operating mechanism on said frame including a driven pulley, and a belt trained over said pulleys; a crankshaft rockably mounted on said frame and having a crank portion at one end, an idler pulley rotatably mounted on the crank portion of said shaft and adapted to engage the belt for tightening the same, spring means connected with the opposite end of said shaft operative to rock said shaft to move said idler pulley to belt tightening position, and a power control member mounted adjacent said opposite end of the crank shaft and movable between two positions, said control member being effective in one position to render said spring means operative on said crankshaft and in its other position to engage the opposite end of the crank shaft to positively hold said idler pulley out of engagement with said belt.

5. In a hay press comprising a frame, an engine mounted thereon having a driving pulley, baler operating mechanism on said frame including a driven pulley, and a belt trained over said pulleys; the combination of a mounting member movably mounted on said frame, an idler pulley journaled on said mounting member and adapted to tighten said belt, spring means operatively connected with said mounting member for swinging said idler pulley into belt tightening position, and a power control member adapted to be connected with said spring and movable to one position to deflect said spring for exerting belt tightening pressure on said idler pulley and movable to another position to engage the opposite end of the mounting member to positively hold the idler pulley out of engagement with said belt.

6. In a power transmission apparatus comprising a frame, a driving pulley, a driven pulley, and a belt trained over said pulleys; the combination of a rock shaft mounted on said frame, a crank portion extending from one end of said rock shaft, an idler pulley journaled on said crank portion and adapted to engage with said belt for tightening the same, a lever pivotally mounted on said frame, and means extending from the opposite end of said rock shaft and engageable by said lever for holding said idler pulley out of engagement with said belt.

7. In a hay press comprising a frame, an engine mounted thereon having a driving pulley, baler operating mechanism on said frame including a driven pulley, and a belt trained over said pulleys; the combination of a rock shaft rotatably mounted on said frame, a crank portion extending from said rock shaft, an idler pulley rotatably mounted on said crank portion and adapted to engage said belt for tightening the same, an arm extending from said rock shaft, a lever pivotally mounted on said frame, a tension spring extending between said arm and said lever, a stop member on said frame adapted to be engaged by said lever for holding the latter with said spring under tension, said lever being releaseable from said stop member by relative lateral movement therebetween, and detent shoulders on said lever and on said stop member for normally preventing such relative lateral movement between the lever and stop member.

8. In a hay press comprising a frame, an engine mounted thereon having a driving pulley, baler operating mechanism on said frame including a driven pulley, and a belt trained over said pulleys; the combination of a crankshaft rockably mounted on said frame, an idler pulley journaled on the crank portion of said shaft and adapted to engage said belt for tightening the same, an arm extending from said crankshaft, a lever pivotally mounted on said frame, a tension spring extending between said arm and said lever, said lever being movable to a position in engagement with said arm for holding said idler pulley out of contact with said belt, and a notch in said arm adapted to be engaged by a portion of said lever for retaining said lever in said latter position.

9. In a hay press comprising a frame, an engine mounted thereon having a driving pulley, baler operating mechanism on said frame including a driven pulley, and a belt trained over said pulleys; the combination of a crankshaft rockably mounted on said frame, an idler pulley journaled on the crank portion of said shaft and adapted to engage said belt for tightening the same, an arm extending from said crankshaft, a diagonal brace bar on said frame in proximity to said arm, a lever pivotally mounted on said brace bar, a tension spring extending between said arm and said lever, said lever being movable to a position in approximate parallelism with said brace bar for tensioning said spring to resiliently hold said idler pulley against said belt, a laterally extending shoulder portion on said lever adapted to be sprung under said brace bar for retaining said lever in the latter position, said brace bar having a slot therein for releasably holding said laterally extending shoulder portion, said lever being movable to another position in engagement with the underside of said arm for holding said arm elevated with said idler pulley out of engagement with said belt, and a notch in the underside of said arm adapted to engage with a portion of said lever for releasably holding the same in said latter position.

10. In a machine embodying a frame, driving and driven elements and belt means for transmitting power from the driving to the driven elements, means for controlling the tension of said belt comprising an idler pulley adapted to contact with the belt, a mounting member therefor pivotally supported upon said frame, a power control member also pivoted on said frame for movement about an axis spaced from the axis of said mounting member, spring means connected between said control member and said mounting member and operative when the control member is shifted in one direction to force the idler pulley into contact with the belt, and cooperating means formed on the mounting member and the control member and operative when the latter is in a given position to positively hold the idler pulley out of contact with the belt.

11. In a machine embodying a frame, driving and driven elements thereon, and belt transmission means for transmitting power therebetween, means for controlling the tension of said belt comprising a member movably mounted on said frame and carrying an idler pulley engageable with the belt to adjust the tension thereof, a separate control member for the mounting member, a flexible element connecting said members whereby the control member is adapted to shift the mounting member to apply tension to the belt, and cooperating means formed on both of said members whereby the control member may be shifted to a position to directly engage the mounting member to hold the latter with its idler pulley out of contact with said belt.

12. In a machine embodying a frame, driving and driven elements thereon, and belt transmission means for transmitting power therebetween, means for controlling the tension of said belt means comprising an idler pulley, a mounting member therefor movably mounted on said frame to shift the idler pulley into and out of contact with said belt means, a control member also movably mounted on said frame spaced from said mounting member, and means connecting said members, said control member being movable to one position and acting through said connecting means to apply force to the mounting member to increase the tension of said belt means and said control member being movable to another position to apply force to the mounting member directly independently of said connecting means, to positively hold the idler pulley out of contact with the belt means.

13. In a machine embodying a frame, driving and driven elements thereon, and belt transmission means for transmitting power therebetween, means for controlling the tension of said belt means comprising an idler pulley, a mounting member therefor movably mounted on said frame to shift the idler pulley into and out of contact with said belt means, a control member also movably mounted on said frame, and means connected with both of said members and operative when the control member is shifted to one position to exert force on the mounting member to increase the tension of said belt means, said control member being adapted in another position to engage said mounting member at a point spaced from said connecting means to apply a force directly to the mounting member to positively hold the idler pulley out of contact with the belt means.

14. In a machine embodying a frame, driving and driven elements thereon, and belt transmission means for transmitting power therebetween, means for controlling the tension of said belt means comprising an idler pulley, a mounting member therefor movably mounted on said frame to shift the idler pulley into and out of contact with said belt means, a control member also movably mounted on said frame, means connected with both of said members and operative when the control member is shifted to one position to exert force on the mounting member to increase the tension of said belt means, and means separate from said connecting means and operable when the control member is shifted to another position to apply force directly to the mounting member to positively hold the idler pulley out of contact with the belt means.

FRANK D. JONES.